Sept. 13, 1960    A. T. SPEES    2,952,395
TEAR TAPE

Filed Oct. 21, 1957    2 Sheets-Sheet 1

INVENTOR.
ARTHUR T. SPEES
BY
Mason & Graham
ATTORNEYS

Sept. 13, 1960     A. T. SPEES     2,952,395
TEAR TAPE
Filed Oct. 21, 1957     2 Sheets-Sheet 2
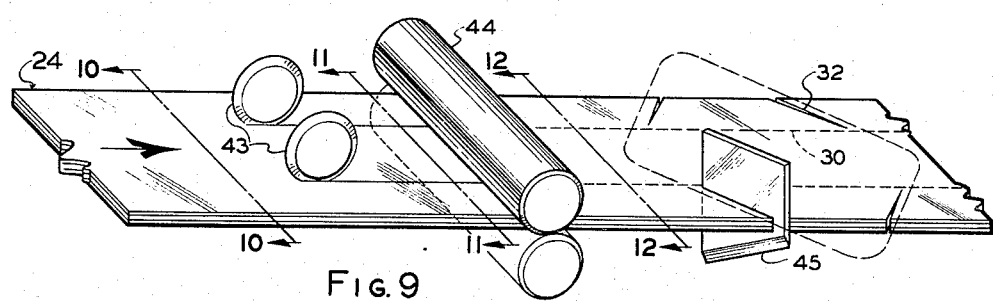
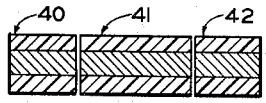
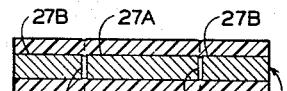
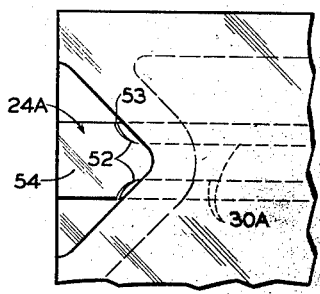
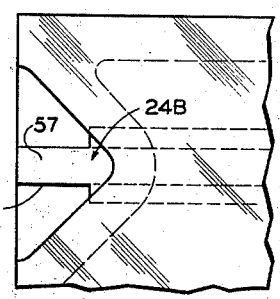
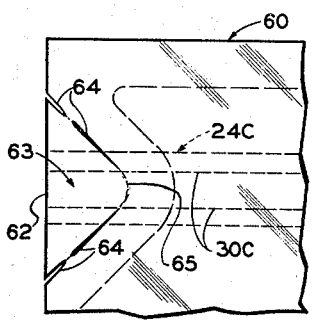
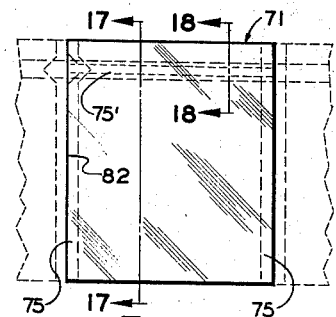
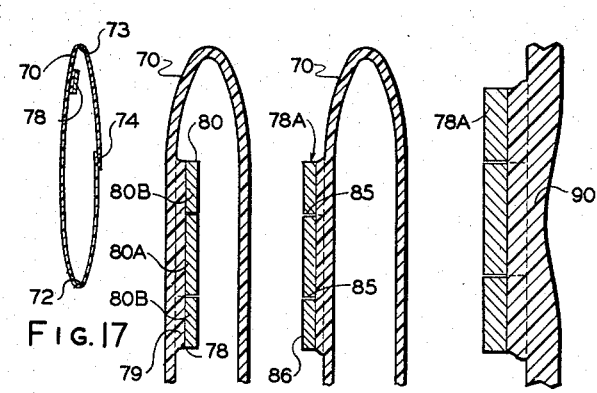
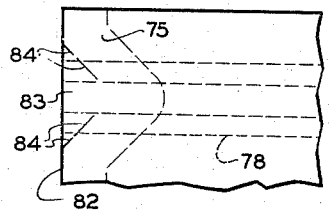
INVENTOR.
ARTHUR T. SPEES
BY
Mason & Graham
ATTORNEYS

United States Patent Office 2,952,395
Patented Sept. 13, 1960

2,952,395

TEAR TAPE

Arthur T. Spees, 2540 W. 7th St., Los Angeles, Calif.

Filed Oct. 21, 1957, Ser. No. 691,421

14 Claims. (Cl. 229—51)

This invention has to do generally with the provision of means for effectively tearing thermoplastic sheet material along a predetermined line or region without the aid of an implement or tool.

The invention is generally similar in nature and use to that set forth in my co-pending application for patent, entitled "Tear Strip Means for Plastic Packaging," Serial No. 613,850, filed October 4, 1956, and reference is made thereto for a discussion of the use of thermoplastic materials in packaging, and the desirability of having incorporated therein some means whereby a package or container of such material can be readily opened in a predetermined region by a simple tearing action.

An object of the present invention is to provide a novel tear tape means for use in conjunction with thermoplastic sheet material, whether the material be a single sheet of such material or be a composite laminated sheet consisting of thermoplastic material and non-thermoplastic material.

A further object is to provide such a tear tape means which may be incorporated in sealed packages in a manner such that, although a pull-tab portion of the tear tape projects from the package, the package is nevertheless completely sealed.

Another object is to provide a novel tear tape construction which can be readily incorporated in the sheet material at the time of manufacture thereof or which can be incorporated in the sheet material at the time the packages are being formed.

A further object is to provide a novel method of making a unique form of tear tape which is suitable for application to thermoplastic sheet material, and to provide such a method which can be used in conjunction with the application of the tape itself to the sheet material.

A still further object is to provide a method of making a package or container embodying novel means for enabling a person to readily open the package.

A further object in this connection is to provide a novel form of container construction.

More particularly it is an object to provide a tearing means for thermoplastic sheet material which serves to reinforce the material along the line or region to be torn, thereby insuring an effective predetermined tearing action.

These and other objects will be apparent from the drawings and the description which follows.

Referring to the drawings.

Figure 1:
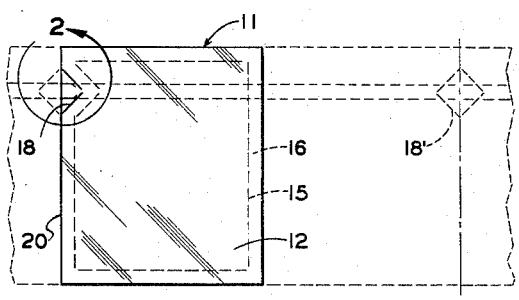
Fig. 1 is a front face view of a bag-type container embodying the invention.
Figures 4A, 5A:
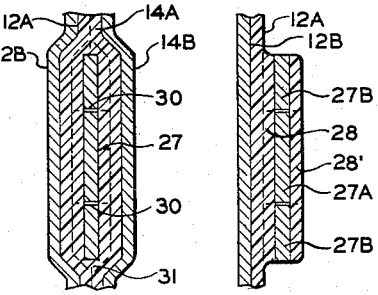
Figure 2:
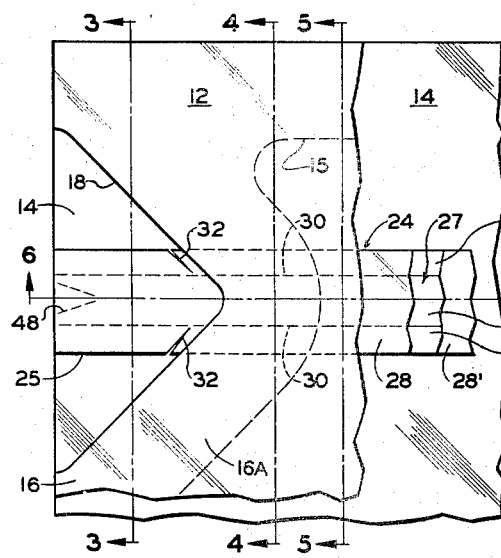
Fig. 2 is an enlarged face view of the upper arrow-encircled corner portion of the container of Fig. 1.
Figures 3, 4, 5:
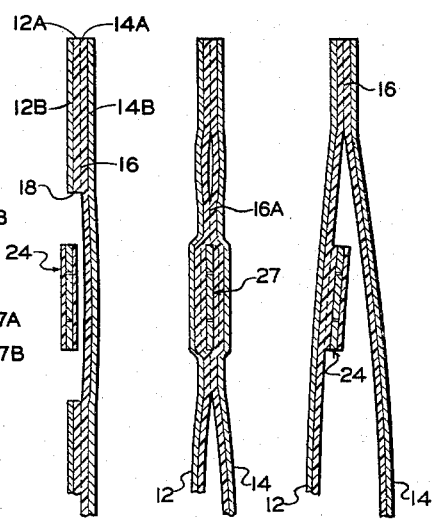
Figure 6:
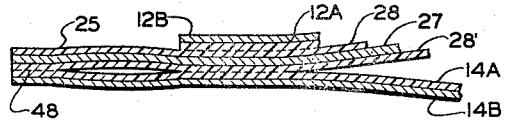
Figure 8:
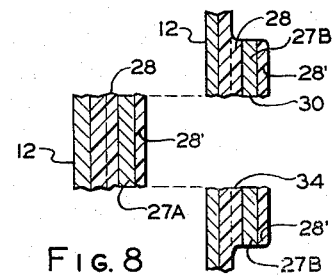
Figure 7:
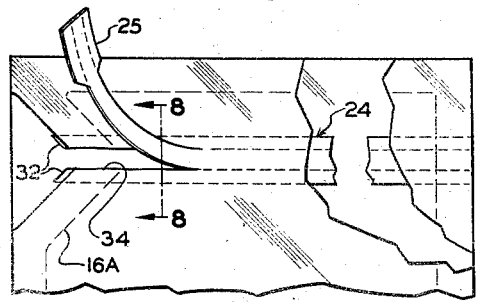

Figs. 3, 4, 5 and 6 are sectional views on lines 3—3, 4—4, 5—5 and 6—6, respectively, of Fig. 2;

Fig. 4A is an enlarged fragmentary view of the central portion of the showing in Fig. 4;

Fig. 5A is an enlarged fragmentary view of the central portion of the showing in Fig. 5;

Fig. 7 is a face view, partly broken away, of the upper portion of the container of Fig. 1, showing the tear tape partially severed;

Fig. 8 is a greatly enlarged fragmentary sectional view on line 8—8 of Fig. 7;

Fig. 9 is a diagrammatic view illustrating one method of making the tear tape;

Figs. 10, 11 and 12 are sectional views on lines 10—10, 11—11 and 12—12, respectively, of Fig. 9, the views being enlarged for clarity with respect to the thickness dimension of the tape;

Fig. 13 is a face view of the corner of a container similar to that shown in Fig. 1, but showing a modification;

Figs. 14 and 15 are views similar to Fig. 13, but showing two other modifications, respectively;

Fig. 16 is a view similar to Fig. 1 showing a container of bag-like form, formed of a single sheet of thermoplastic material and embodying another form of my tear tape;

Fig. 17 is a sectional view on line 17—17 of Fig. 16;

Fig. 18 is a sectional view on line 18—18 of Fig. 16, but on a larger scale;

Fig. 19 is a view similar to Fig. 18, but showing a different application of the tear strip;

Fig. 20 is an enlarged sectional view through the type of tear tape shown in Fig. 19, with the sheet material to which it is applied shown modified; and Fig. 21 is an enlarged face view of the upper left corner portion of Fig. 16.

More particularly describing the invention, in Fig. 1, I show a container 11 of bag-like form comprising a front sheet 12 and a rear sheet 14. The sheets have been shown as consisting of two layers of material forming a laminated construction in which the inner layer is formed of a thermoplastic material, such as polyethylene, and the outer layer of a non-thermoplastic material. Numerals 12A and 14A designate the inner layer of sheets 12 and 14, respectively, while numerals 12B and 14B, the outer layers.

The container 11 is sealed around its margins in the region outwardly of the broken line 15 in Fig. 1 by the application of heat and pressure, whereby the two inner layers 12A and 14A of the two sheets 12 and 14 are united in such region, designated 16.

In Fig. 1, I show the forward sheet 12 of the container provided with a somewhat V-shaped cut-out portion or recess 18. In a continuous process of manufacture, holes 18' may be punched in the sheet material and, subsequently, after the bags or containers have been formed with the tear tape incorporated, the material, which is then doubled, comprising the front and rear sheets 12 and 14, as it appears in Fig. 1, may be cut along the lines 20 providing half of the hole portion 18' (recess 18), in each of the front sheets of adjacent bags or containers.

In order to provide means for readily and effectively opening the forward sheet 12 of the container, I provide a laminated tear strip which is designated generally 24. This is united with the inner side of sheet 12 and extends to project into the area of the cut out or recess 18, providing a pull-tab portion 25. The tear tape is formed of an inner core or layer of a flexible, relatively strong, stretch-resistant, non-thermoplastic material, designated 27 and outer covering layers 28 and 28' of a thermoplastic material which may be the same as the material of layer 12A of sheet 12, or may be another material compatible therewith.

In the form of the invention shown in Figs. 1 to 12 presently being described, the core or inner layer 27 of the tape is shown divided into three sections, namely, an inner or central section 27A and marginal sections 27B.

These are shown separated by slits or lines of parting 30 extending longitudinally of the tape. The tape 24 is applied to the inner surface of the sheet 12 by the application of heat and pressure, whereby the tape is thereby actually united with the thermoplastic inner layer 12A of sheet 12. In the region of the recess 18, the marginal sealing area 16 follows the outline of the recess 18, providing a sealed area 16A, and when the bag or container is sealed or formed in this region the tear tape 24 is sealed to and united with both the inner and outer sheets 12 and 14 so that a hermetically sealed joint is achieved in the region where the tape passes through the container to the outside thereof. At its other end the tape is also sealed between the sheets 12 and 14 in the sealed area 16.

It should be noted that there is a fusion of the thermoplastic layers 12A and 14A of the package and layers 28 and 28' of the tear tape around and into intimate contact with the lateral edges of the core of the tear tape 27 in the regions 31 as best shown in Fig. 4A thereby effecting a fluid-tight seal where the tape passes from the interior to the exterior of the package.

In Fig. 2 the tab portion 25 of the tape is shown provided with a pair of inclined slits 32, which cut through the outer marginal portions of the tape substantially to the slits 30. Consequently, when the tab 25 is grasped and pulled forwardly and to the right, as shown in Fig. 7, the tape readily begins to part or tear along the slits 30 inwardly of the slits 32 and carries with it the overlying portion of the front sheet 12, providing a slot 34 in the front of the container. It will be apparent that in the tearing operation the portions of sheet 12 bordering slot 34 are strongly reinforced against stretching and tearing by the two marginal portions 27B and 27B of the tear tape 24, which remain secured to the sheet 12. Since the inner core or layer 27 is much stronger than the front sheet 12, the latter readily gives way and is precisely torn as the tear tape is pulled.

While it is not essential that I utilize a tear tape such as that designated 24 having the slits 30 and the inner layer or core, and in lieu thereof may use a tape which is merely scored or in which the core is so woven or processed at the time of manufacture that it has a tendency to tear readily longitudinally as opposed to other directions, I prefer to use the construction previously outlined and in Figs. 9–12 I show a simple method of making such a tape. Referring to these figures, in Fig. 9, I show the tape 24 which may be assumed to be traveling during processing in the direction of the arrow shown thereon. The tape is originally formed of three layers, namely, the inner layer 27 of flexible, non-thermoplastic, substantially non-stretchable, relatively strong material, and the two outer layers of thermoplastic material, these being designated 28 and 28'. The three layers are laminated by any conventional process by which this is done in the art. As the tape proceeds in the direction of the arrow it is slit into three longitudinally extending strips designated 40, 41 and 42, as by means of cutters 43. Subsequently, heated rollers 44, or other means is used to apply heat and pressure, thereby re-uniting the segments of the outer layers as best shown in Fig. 12 so that only the core or inner layer 27 is left divided into its three component strips 27A, 27B and 27B. After the outer layers of the tape have been re-united over the slits 30, fully enclosing and sealing the slitted areas, the resulting tape is applied to the sheet material 12 by heat and pressure and across the center of opening 18'. The tape is then cut, as by knives 45, to produce the slits 32 previously referred to. Following this, the rear sheet 14 is brought into place behind the front sheet 12 and the two united or sealed together in the aforementioned region 16 and 16A, the rear surface or layer of the tape being sealed to sheet 14 in the region 16A and at the other end thereof.

If desired the tab end 25 of the tape may be releasably anchored to the rear sheet 14 of the container by heat-sealing or by application of an adhesive in the region 48 (Fig. 2), thereby preventing the accidental dislodgment of the tab and the possible premature opening of the container.

Referring now to Fig. 13, I show a modification wherein the tape, designated 24A, is similar to the tape 24 previously described, except that the slits extending longitudinally of the core or inner layer of the tape here designated as 30A, terminate short of the end of the tape in the regions 52 where they intersect or substantially intersect slits 53 which extend through the entire body of the tape and serve to define a wide tab portion 54.

In Fig. 14, I show another modification wherein the tear tape, here designated by numeral 24B, is shown provided with a tab portion 57 of reduced width and corresponding in width to and being a continuation of only the central section of the tape.

Referring now to Fig. 15, I show the upper left-hand corner of a package or container designated 60, which is generally similar to that shown in Fig. 1 except that it is not provided with the recess 18 heretofore described. In this form of the invention the tear tape, which is designated by numeral 24C, extends to the edge 62 of the container and a pull-tab portion 63 is formed by the provision of the interrupted slits 64 extending diagonally inward from the edge 62 in a converging direction to intersect or nearly intersect with the longitudinal slits 30 of the tear tape. Thus, both the front and rear sheets of the container, as well as a tab portion of the tear tape in the region defined by the slits 64, form a pull-tab for the tape. The interrupted slits 64 serve to hold the pull-tab segments in position until used in opening the package and guard against premature opening. When the tab is pulled the front sheet is cleanly sheared as previously described in connection with the description of Figs. 1–7, however, since in this case the tab is also formed in part by the rear sheet of the package, the rear sheet of the package necessarily tears approximately along line 65 as the tab is pulled.

In Figs. 16 to 18 and in Fig. 21 I show another form of the invention which is designed particularly for use in connection with a sheet 70 of single-thickness thermoplastic material. The sheet 70 is shown shaped to form a container 71, which is folded at 72 and 73 upon itself and heat-welded or united along a seam 74. The lateral margins are shown sealed in the regions 75 by heat and pressure. In this instance, the tear tape, which is designated generally by numeral 78, is shown as comprising a laminated two-layer tape comprising one layer 79 of thermoplastic material which is united to the inner surface of the sheet 70, and another layer 80 which comprises the center strip 80A, and two marginal strips 80B of non-thermoplastic, non-stretchable, relatively strong material. In this form of the invention the tape extends out to the edge 82 of the container and has a tab end 83 defined by slits 84 at the margin of the sheet. The tab end may be formed in any of the ways previously described. Since the sheet 70 is reinforced by sections 80B of the tape, the portion of the sheet overlying the center section of the tape is readily torn out when the tape is pulled.

In Fig. 19 I show a modification wherein the tear tape, designated 78A, is similar to the tape 78, but placed on the outside of the container. A portion (not shown) is left free at one end of the tape to act as a tab and this may be formed as in Fig. 2, Fig. 13, or Fig. 14. In operation, when the central portion of the tape is pulled, it serves to sever the sheet of the container along lines coincident with the slits 85 in the non-thermoplastic layer 86 of the tape. In this connection, should the material of the container be exceptionally thick or strong, it may be weakened in the region of the tape by causing a thinner section to occur at this region as the tape is applied by heat and pressure, as indicated at 90 in Fig. 20.

It is to be understood that various changes and modifi-

I claim:

1. In a sheet of material having at least one surface portion of thermoplastic material, tear tape means for said sheet comprising a laminated tape including at least one layer of thermoplastic sheet material united with said one surface portion of said sheet and a layer of non-thermoplastic material, said last-mentioned layer having at least one longitudinal line of weakness dividing the same into at least two longitudinal sections, and a pull-tab on one end of one of said longitudinal sections.

2. In a sheet of material having at least one surface portion of thermoplastic material, tear tape means for said sheet comprising a laminated tape including at least one layer of thermoplastic sheet material united with said one surface portion of said sheet and a layer of non-thermoplastic material, said last-mentioned layer having a pair of laterally spaced longitudinal lines of weakness dividing the same into three longitudinal sections, and means providing a pull-tab on one end of one of said longitudinal sections.

3. In a sheet of material having at least one surface portion of thermoplastic material, tear tape means for said sheet comprising a laminated tape having a core layer of relatively strong non-thermoplastic material and a layer of thermoplastic material on each side thereof, said core layer having one or more lines of weakness extending longitudinally thereof and dividing the same into readily separable sections, said tape having one of its thermoplastic layers united with said one surface portion of said sheet.

4. A tear tape adapted to be united by application of heat and pressure with a sheet of material having at least one thermoplastic surface portion comprising an elongated, flexible, relatively strong strip of non-thermoplastic material and a strip of thermoplastic material laminated thereto, said strip of non-thermoplastic material having at least one line of weakness extending longitudinally of the same and dividing the same into readily separable sections.

5. A tear tape as set forth in claim 4 in which said strip of non-thermoplastic material has a pair of lines of weakness dividing the same into readily separable sections, and means on one of said sections providing a pull-tab.

6. A laminated tear tape adapted to be united with a sheet of material having a thermoplastic surface portion, comprising a core strip layer of flexible, relatively strong, non-thermoplastic material, and a covering layer of thermoplastic material on each side thereof, said core strip layer being divided into readily separable sections by one or more longitudinal lines of weakness.

7. In a packaging means, sheet material forming the package and including overlying sheet sections having opposing thermoplastic surfaces, said surfaces being united in a given region to effect a seal between the sheet sections, and tear tape means for opening the package, said tear tape means comprising a laminated strip extending a substantial distance across the thermoplastic surface of one sheet section and between said sheet sections through said given region of seal to the exterior of the package, said tear tape means including a core layer of non-thermoplastic, relatively strong material and an outer layer on each side thereof of thermoplastic material, one of said outer layers being united with the thermoplastic surface of said one said sheet section and the other of said outer layers being united with the thermoplastic surface of the other of said sheet sections in the region where it traverses said given region of seal, and pull-tab means on the portion of said tear tape means exteriorly of said package.

8. A packaging means as set forth in claim 7 in which said core layer of said tear tape means is formed to provide at least two sections readily separable along a line extending longitudinally of the core layer and in which said pull-tab means is effective, when pulled, to pull away one of said sections leaving the other in place.

9. A packaging means as set forth in claim 7 in which said core layer of said tear tape means is formed to provide at least three sections readily separable along lines extending longitudinally of the core layer and in which said pull-tab means is effective, when pulled, to pull away the central section of said three sections leaving the other two sections in place.

10. In a packaging means, a pair of sheet sections having opposed thermoplastic surfaces, said sheet sections being united in overlying relation along a given margin thereof forming a seal, one of said sheet sections having a recess at said given margin exposing the other sheet section, and a tear tape having thermoplastic surfaces extending from the inside of said packaging means through said seal and being united with said sheet sections at the region of the seal, said tear tape projecting into the region of the recess of said one section, said tape extending across the surface of and being united with the thermoplastic surface of the sheet section having said recess.

11. Packaging means as set forth in claim 10 in which said tear tape comprises a core layer of flexible, relatively strong non-thermoplastic material and an outer layer on each side thereof of thermoplastic material in which said bore layer is divided into two or more longitudinal sections by one or more longitudinally extending lines of weakness and in which pull-tab means is provided on the end of said tape exteriorly of the packaging means effective, when pulled, to exert pulling force on one of said longitudinal sections.

12. Packaging means as set forth in claim 10 in which means is provided releasably securing the portion of said tear tape in the area of said recess to the other of said sheet sections.

13. In packaging means, a pair of sheet sections having opposed thermoplastic surfaces, said sections being united in overlying relation along a marginal area thereof, a tear tape having a core layer of non-thermoplastic material and covering layers of thermoplastic material, said tape being united with and extending across the surface of one of said sheet sections and extending through the united overlying sections of said sheet sections, said tear tape having its core layer divided into three separable longitudinal sections, said sheet sections being interrupted along two lines converging inwardly from the edge of said overlying area toward the center section of said core layer and said tape being interrupted in alignment with the interruptions of said sheet sections through its sections laterally outward of its center section whereby to form a pull-tab for said center section of the tape.

14. In a sheet of relatively strong thermoplastic material, tear tape means for said sheet comprising a laminated tape including at least one layer of thermoplastic sheet material united with said one surface portion of said sheet and a layer of non-thermoplastic material, said last-mentioned layer having a pair of longitudinal lines of weakness dividing the same into three longitudinal sections, and a pull-tab on the central of said sections, said sheet being formed to have a thinner cross-sectional thickness in the region overlain by the central part of said laminated tear tape in the regions adjacent thereto.

References Cited in the file of this patent

UNITED STATES PATENTS

| | | |
|---|---|---|
| 1,827,636 | Ames | Oct. 13, 1931 |
| 2,079,328 | McBean | May 4, 1937 |
| 2,231,529 | Dey | Feb. 11, 1941 |
| 2,307,406 | Howard | Jan. 5, 1943 |
| 2,699,285 | Bell | Jan. 11, 1955 |
| 2,773,634 | Megoro | Dec. 11, 1956 |